June 3, 1930.  P. E. FENTON  1,762,118
PIN FASTENER
Filed May 28, 1929
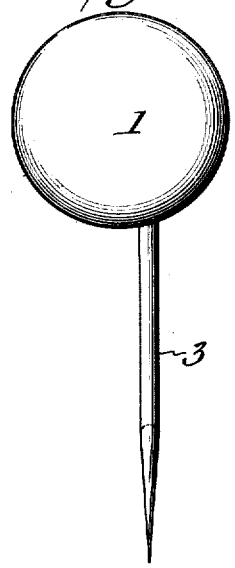
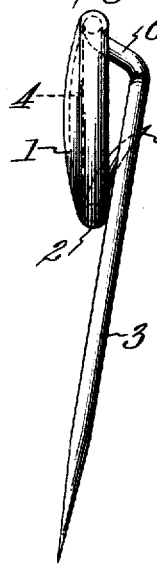
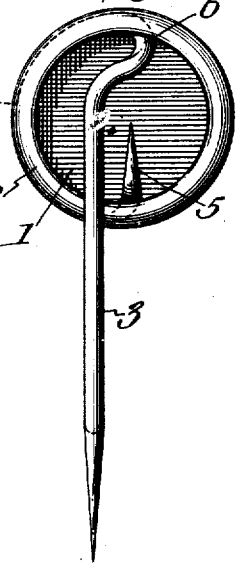
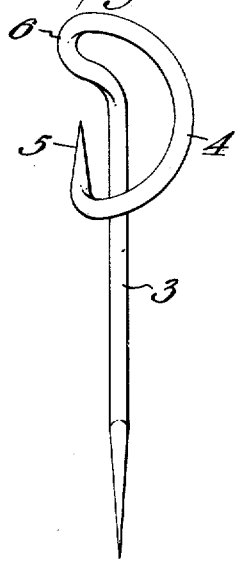
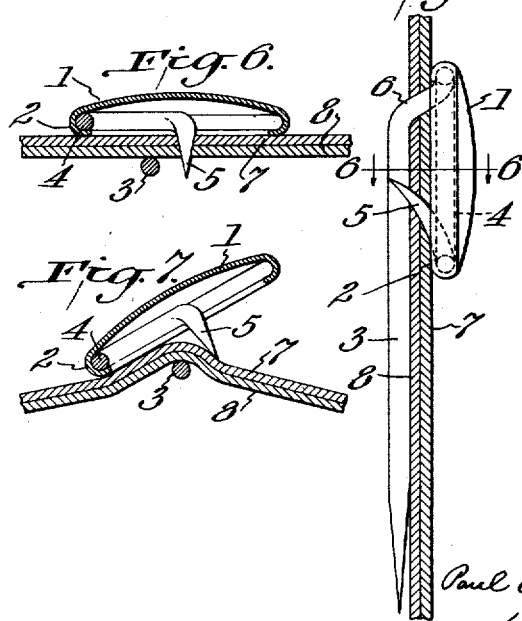
Inventor
Paul E. Fenton
by
W. H. Finckel
Attorney Patented June 3, 1930

1,762,118

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

PIN FASTENER

Application filed May 28, 1929. Serial No. 366,617.

The object of this invention is to provide a pin for fastening a loose article to a fixed part, such as a cover for automobile seats and other upholstered parts.

In the present preferred embodiment of my invention, the pin is of the single-point type, with the head curved to fit a cap and bent eccentrically and terminating in a sharp point or spur which engages with a part to which the pin is applied in such way as to prevent accidental disengagement of the pin from such fixed part, and yet permitting desired disengagement by a tilting movement of the pin in an axial line, without the interposition or use of a tool, as I will proceed now to explain more fully and finally claim.

In the accompanying drawings illustrating the invention, in the several figures of which like parts are similarly designated, Figure 1 is a front elevation; Fig. 2 is a side elevation, and Fig. 3 is a rear elevation of a capped pin-fastener. Fig. 4 is a front elevation of the pin without the cap. Fig. 5 is a side elevation of the pin fastener applied to a fragment of an article shown in section. Fig. 6 is a cross-section taken on line 6—6 of Fig. 5, and Fig. 7 is a similar view illustrating the disengaging action.

Without thereby limiting the utility of the invention, I will proceed to explain more fully the construction of a pin fastener designed for use in attaching covers to the desired parts, such as the seats, of an automobile.

The cap 1 may be of any usual or approved construction, ornamented or otherwise, and having the rim flange 2 which serves to connect with the pin. The pin has the sticking member 3, and a head composed of the arcuate or otherwise shaped portion 4 to engage with the closed-in flange 2, as shown in Figs. 2, 3, 5, 6 and 7, and the reverted sharp point or spur 5 curved and extending rearwardly of the cap and sticking member. The top 6 of the pin next to the portion 4 is crooked laterally and rearwardly and to one side of the axis of the sticking member 3, and overlies the spur 5. The end of the portion 4 crosses the sticking member 3, with its spur 5 on the side of the member 3 opposite to the portion 4.

The crooked portion 6 throws the sticking member 3 to one side of the center of the cap.

When the sticking member is stuck in a loose object, such as a seat cover, as indicated at 7, and then applied to a fixed object, such as an automobile part, indicated at 8, it is forced into it up to the crooked top 6 and the spur 5 enters the material in the opposite direction so that it opposes any accidental escape of the pin, as shown in Figs. 5 and 6. When it is desired to detach the pin, the cap may be tilted laterally from the side adjacent to the spur 5, using the sticking member as an axis, and the spur 5 is thereby automatically moved out of locking engagement with the article, as indicated in Fig. 7.

The spur is so arranged as to pierce the material squarely, and lies at an angle of 90° to the final resting place of the material after it has been pushed down the entire length of the sticking member, and this is a most effective nature of locking the pin in place, because it does not have a tendency of injuring the material and is readily detachable without injury to the material and without application of a tool. Merely tipping the cap sharply backwardly on the side opposite to the spur, removes the spur from the material and allows the whole pin to be withdrawn easily and without injury to the material.

Variations in the details of construction are permissible within the principle of the invention and the scope of the claims following.

What I claim is:—

1. A pin fastener, having a sticking member and a head, the head provided with a laterally crooked portion which serves to throw the sticking member off center, said head terminating in a spur.

2. A pin fastener, having a sticking member and a head, the head provided with a laterally crooked portion which serves to throw the sticking member off center, said head terminating in a spur, the spurred end of the head crossing the sticking member and located beneath the crooked portion.

3. A pin fastener, having a sticking member and a head, the head provided with a crooked portion which serves to throw the sticking member off center, said head terminating in a spur, and a cap engaging a portion of the head and its spurred end, the sticking member being eccentric with relation to the cap.

4. A pin fastener, having a sticking member and a head, the head provided with a crooked portion which serves to throw the sticking member off center, said head terminating in a spur, the spur extending rearwardly and adapted to engage an article to which the pin is applied, as the pin is applied, and to be disengaged from such article by a tilting motion of the head on the axis of the sticking member.

5. A pin fastener, having a sticking member and a head, the top of the head being crooked laterally and rearwardly and terminating at its bottom in an upwardly and rearwardly extending spur located beneath the crooked top and to one side of the sticking member, so that the pin may be disengaged purposely from an article by a lateral tilting movement using the sticking member as an axis.

6. A pin fastener, having a cap and a pin member comprising a sticking member and a head engaged by said cap, said head having a crooked portion by which the sticking member is offset eccentrically with relation to the cap, said head terminating in a rearwardly and upwardly extending spur which engages the article to which the pin is applied coincidently with the sticking of the pin in said article, the spur being released from such engagement by a tilting motion of the head on an axis coincident with the sticking portion.

7. A pin fastener, having a cap, and a pin comprising a sticking member and a head engaged by said cap, said head having a portion crooked off to one side and also rearwardly, whereby the sticking member is offset eccentrically with relation to the cap, and said head terminating in a rearwardly and upwardly extending spur which is arranged alongside the sticking member and is adapted to engage the article to which the pin is applied coincidently with the sticking of the pin in said article, the spur being released from such engagement by a tilting motion of the head on an axis coincident with the sticking portion.

In testimony whereof I have hereunto set my hand this 27th day of May, A. D. 1929.

PAUL E. FENTON.